(12) United States Patent
Müller et al.

(10) Patent No.: US 8,032,283 B2
(45) Date of Patent: Oct. 4, 2011

(54) ANGLE MEASURING APPARATUS FOR MEASURING AN ABSOLUTE ANGULAR POSITION

(75) Inventors: Hilmar Müller, Heuchelheim (DE); Manfred Goll, Glauburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 441 days.

(21) Appl. No.: 12/159,944

(22) PCT Filed: Dec. 13, 2006

(86) PCT No.: PCT/EP2006/069657
§ 371 (c)(1),
(2), (4) Date: Sep. 25, 2008

(87) PCT Pub. No.: WO2007/082610
PCT Pub. Date: Jul. 26, 2007

(65) Prior Publication Data
US 2010/0017062 A1   Jan. 21, 2010

(30) Foreign Application Priority Data

Jan. 11, 2006  (DE) .......................... 10 2006 001 606

(51) Int. Cl.
*G06F 7/00* (2006.01)
(52) U.S. Cl. ........................................................ 701/42
(58) Field of Classification Search .................... 701/41, 701/42; 324/207.11, 207.22, 207.25; 356/138, 356/620
See application file for complete search history.

(56) References Cited

U.S. PATENT DOCUMENTS 6,670,804 B1 * 12/2003 Glemser et al. .......... 324/207.16
2005/0075828 A1 * 4/2005 Sakabe et al. ................. 702/151

FOREIGN PATENT DOCUMENTS

| DE | 41 15 244 A1 | 11/1992 |
| DE | 198 07 522 A1 | 3/1999 |
| DE | 199 04 000 A1 | 8/2000 |
| DE | 199 35 429 A1 | 2/2001 |
| DE | 103 44 267 A1 | 4/2005 |
| EP | 0 874 751 B1 | 11/1998 |
| EP | 1 238 891 B1 | 9/2002 |

OTHER PUBLICATIONS

Patent Abstract of Japan, publication No. 2003254745 A, date of publication: Sep. 10, 2003, Applicant: Yazaki Corp.

* cited by examiner

*Primary Examiner* — Kim T Nguyen
(74) *Attorney, Agent, or Firm* — RatnerPrestia

(57) ABSTRACT

An angle measuring device for measuring an absolute angular position is described herein. The angle measuring device comprises a flexible pulling element guided directly or indirectly via a shaft whose angle of rotation ($\phi$) is to be detected, with different circumferential speeds ($v_1$, $v_2$) developing at the inner circumference of the flexible pulling element during a rotational movement of the shaft. A change in position of the flexible pulling element relative to the rotational movement occurs, and the angle of rotation ($\phi$) of the shaft is inferred from this change in position.

10 Claims, 2 Drawing Sheets

ANGLE MEASURING APPARATUS FOR MEASURING AN ABSOLUTE ANGULAR POSITION

This application is the U.S. national phase application of PCT International Application No. PCT/EP2006/069657, filed Dec. 13, 2006, which claims priority to German Patent Application No. DE102006001606.8, filed Jan. 11, 2006, the contents of such applications being incorporated by reference herein in their entirety.

BACKGROUND OF THE INVENTION

1. Field of the Invention

One aspect of the present invention relates to an angle measuring device, and a use thereof.

2. Description of the Related Art

Angle measuring devices are frequently used to detect the steering angle in motor vehicles, for example, in order to determine the steering angle in driving-dynamics control (ESP). Furthermore, it is also necessary to detect the steering angle in motor vehicle control systems which perform an active steering intervention.

In this regard, angle measuring devices are known which can measure the absolute angle within a revolution as well as the number of the revolutions.

In addition, it is known that special demands are placed on the availability of the steering angle measurement due to the possibility of active steering interventions being performed by a motor vehicle control system. Thus, a special demand of a motor vehicle control system of this type being placed on the angle measuring device is to know about the steering angle during the time directly after the activation of the motor vehicle although steering movements or indirect steering movements, provoked by external disturbances, can occur also outside the vehicle operation and must be taken into account.

Published application EP 1 238 891 B1 discloses a steering angle sensor which includes a mechanically coupled counting wheel for detecting the number of revolutions in addition to a code disc whose position and, thus, the absolute angle during a revolution is sensed by sensors. The absolute angle is calculated from a combination of the output signals of two magnetic field sensors and the position of the counting wheel. To be able to perform an absolute angle measurement with this sensor directly after start of the motor vehicle, it is necessary to supply the steering angle sensor with voltage also during an inactive vehicle state, with the result that the electric energy supply of the motor vehicle is highly stressed depending on the duration of this state. Furthermore, the mechanics is relatively complicated and susceptible to wear.

Published application DE 103 44 267 A1 describes a method using a semi-relative steering angle sensor. When the ignition of the vehicle is switched off, the steering angle sensor senses steering wheel movements and stores them electronically. When the ignition is activated, in case disturbances could not be registered, data is used to calculate the current steering angle. A shortcoming of this system resides in the fact that both the sensor and the electronic memory must be supplied with energy in the inactive vehicle state, which burdens the vehicle battery. Furthermore, the angle is subsequently calibrated in the event of disturbances and cannot be sensed directly by the steering angle sensor. The calibration is executed by identifying straight travel during driving, with this straight travel being judged based on the temporal variation of the yaw rate.

It is disclosed in publication EP 0 874 751 B1 to employ a mechanical counter in addition to an angle-of-rotation sensor which measures the absolute angle within a revolution by means of a code disc. In this arrangement, the mechanical counter is coupled mechanically to the code disc, counting the revolutions. Thus, the absolute angle of rotation is sensed at any time also beyond a revolution. Disadvantageous in this construction is the rather complicated mechanics of the code disc and the counter, as well as the torque transmission of the mechanical coupling, which is susceptible to wear and does not function noiselessly.

An angle measuring device, which measures an angle absolutely and with a high angular resolution over a range of several revolutions, with the resulting angle of one or more angular variations being sensed by the device also in the condition of the electronics being deactivated is described herein. The objective is to avoid constant energy supply of the sensors or a technically sophisticated independent waking in the case of a movement to be registered so that the angle measuring device is only active when the motor vehicle is active. Another objective is that the device shall exhibit least possible wear, develop least possible noise and shall be cost-effective.

SUMMARY OF THE INVENTION

This object is achieved according to aspects of the invention by the angle measuring device.

An idea of measuring an absolute angular position with the aid of an angle measuring device, with a flexible pulling element being guided directly or indirectly over a shaft whose angle of rotation is to be detected in such a fashion that different circumferential speeds develop at the inner circumference of the flexible pulling element during a rotational movement of the shaft. The result is a change in position of the flexible pulling element relative to the rotational movement, and the absolute angle of rotation of the shaft is inferred from this change in position is described herein.

The fact that the flexible pulling element does not serve for torque transmission renders mechanical wear as well as noise development very insignificant.

A flexible pulling element refers to a flexible means which is closed via an inner circumference and an outer circumference. Examples in this respect are different embodiments of belts, strips, chains, strings, cables or wires, or a variant of any other mechanical driving means, as the case may be.

The absolute total angle of rotation implies the absolute angle over a measurement range of more than 360°. It comprises the items of information about the absolute angle within a revolution as well as the number of revolutions.

It is suitable to configure the outer circumference of the respective disc or shaft in a toothed fashion, whereby compulsory guidance of the flexible pulling element is facilitated and slip between the flexible pulling element and the toothed disc/shaft is prevented.

Preferably, the orientation of the direction of rotation and the absolute total angle of rotation of the shaft is inferred from the position of the flexible pulling element. As a result, it is only required to evaluate one quantity, i.e. the position of the flexible pulling element, rather than several quantities, as is general practice, when measuring an angle of rotation in an angular range of more than 360°.

As an alternative of magnetic encoding and acquisition, the flexible pulling element is suitably marked in optical or tactilely determinable fashion, and its position is detected by at least one optical sensor or contact sensor. Such identification markings can be adapted to the respective ambience of the device, and it is thus possible to react to determined interferences such as external electromagnetic irradiation or to avoid their effect on the measurement.

Preferably, one sensor detects the angle of rotation within a revolution, and another sensor detects the number of the revolutions. Higher resolution of the angle within a revolution can be achieved thereby, and the effort in calculation of the number of revolutions is simplified.

Preferably, the overall angle measuring device consists of a toothed wheel with two different diameters, which is fixed on the shaft whose angle of rotation is to be detected, with a flexible pulling element being guided via the shaft. Furthermore, the angular measuring device comprises a board on which the processing electronics is contained, as well as a housing in which a plug is integrated. A configuration of the device of this type can be implemented in a motor vehicle in a relatively simple manner since defined interfaces can be realized by way of the processing electronics and the plug.

The device preferably uses only one optical distance sensor. Said distance sensor is installed on the left or right side of the shaft in an axial direction and registers the distance between itself and the half loop of the belt. During a relative movement of the belt, its non-abutting part is shifted a certain distance depending on the direction of rotation and the angle of rotation. As this occurs, each of the two non-abutting parts of the belt forms a half loop, which becomes larger or smaller depending on the direction of rotation and the rotational movement. The positioning of the flexible pulling element viewed relative to the direction of rotation is corresponding to the distance explained hereinabove, and thus also the absolute angle of rotation. Alternatively, a different distance sensor can also be employed which is able to detect the distance with the necessary resolution.

It is expedient that the angle measuring device includes a belt which is magnetically encoded. The belt consists of a mixture of elastic plastic material with a magnetic powder. This compound of materials can be adapted easily to the application-related demands by selection of the respective plastics, the elasticity and the shape-keeping property, and the necessary encodability can be achieved at the same time by adding the magnetic powder.

A coded toothed belt as described above is provided in particular. Impressed on it is a special magnetic index.

Data processing in the board preferably comprises safety concepts in addition to angle calculation and signal conditioning. The concepts relate to a self-diagnosis which requires for its realization using the data of the already installed sensors as well as especially at least one additional sensor. It is identified within the context of the self-diagnosis if a crack has occurred in the flexible pulling element or if the latter has slipped inadmissibly to one side. More particularly, the safety concept described above also comprises an overvoltage protection and an electronic filter filtering signal frequencies which are detrimental to the electronics. These spurious signals generally enter from outside into the electronics and lines thereof.

As a special protection against such unwanted electromagnetic irradiation, the housing preferably has an electromagnetically screening design. This is achieved by appropriate housing materials and a suitable housing design.

There are alternative concepts for the configuration of data processing and the interaction of the device with external systems. It is suitable to merely condition data in the board and to transmit data in analog fashion via the plug to external systems such as the motor vehicle control system. Alternatively, one or ore sensor signals can already be conditioned in the board and can be digitized by means of an analog-digital converter. Subsequently, digital data is transmitted in a defined form, especially by processing in a modulator and/or a multiplexer, via the plug to external systems.

More particularly, this transmission is wireless. Data is e.g. transmitted by a radio transmitter for this purpose. In an alternative form, data is memorized in a transponder and read out this way by an external system.

It is expedient to supply the angle measuring device with voltage via the signal lines from an external system. However, it is likewise possible to equip the device directly with supply lines or to feed it with the aid of a long-service battery.

According to one aspect of the invention, a steering angle sensor is provided for use in a motor vehicle.

The angle measuring device described hereinabove can be employed in different areas for measuring absolute angles and absolute total angles of rotation. In this respect, the application of this angle measuring device is useful especially in steering systems of motor vehicles such as passenger cars, trucks and single-track motor vehicles in order to determine the steering angle. The data of the angle measuring device is sent to the respective motor vehicle control system, and data about the absolute steering angle position is available with good accuracy also directly after the activation of the motor vehicle. Due to its properties, this angle measuring device is also well suited for the integration into concepts for active steering systems or for the application within the context of motor vehicle control systems with active steering intervention.

It is furthermore possible to employ the angle measuring device in fields of industrial automation systems and control engineering. A special field of application is robot technology. The arm of an industrial robot usually has six degrees of freedom, some of which are realized by rotations of the arm whose angles must be detected within the context of a control action.

These and other aspects of the invention are illustrated in detail by way of the embodiments and are described with respect to the embodiments in the following, making reference to the Figures.

DETAILED DESCRIPTION OF THE PREFERRED EMBODIMENTS

Figure 1:
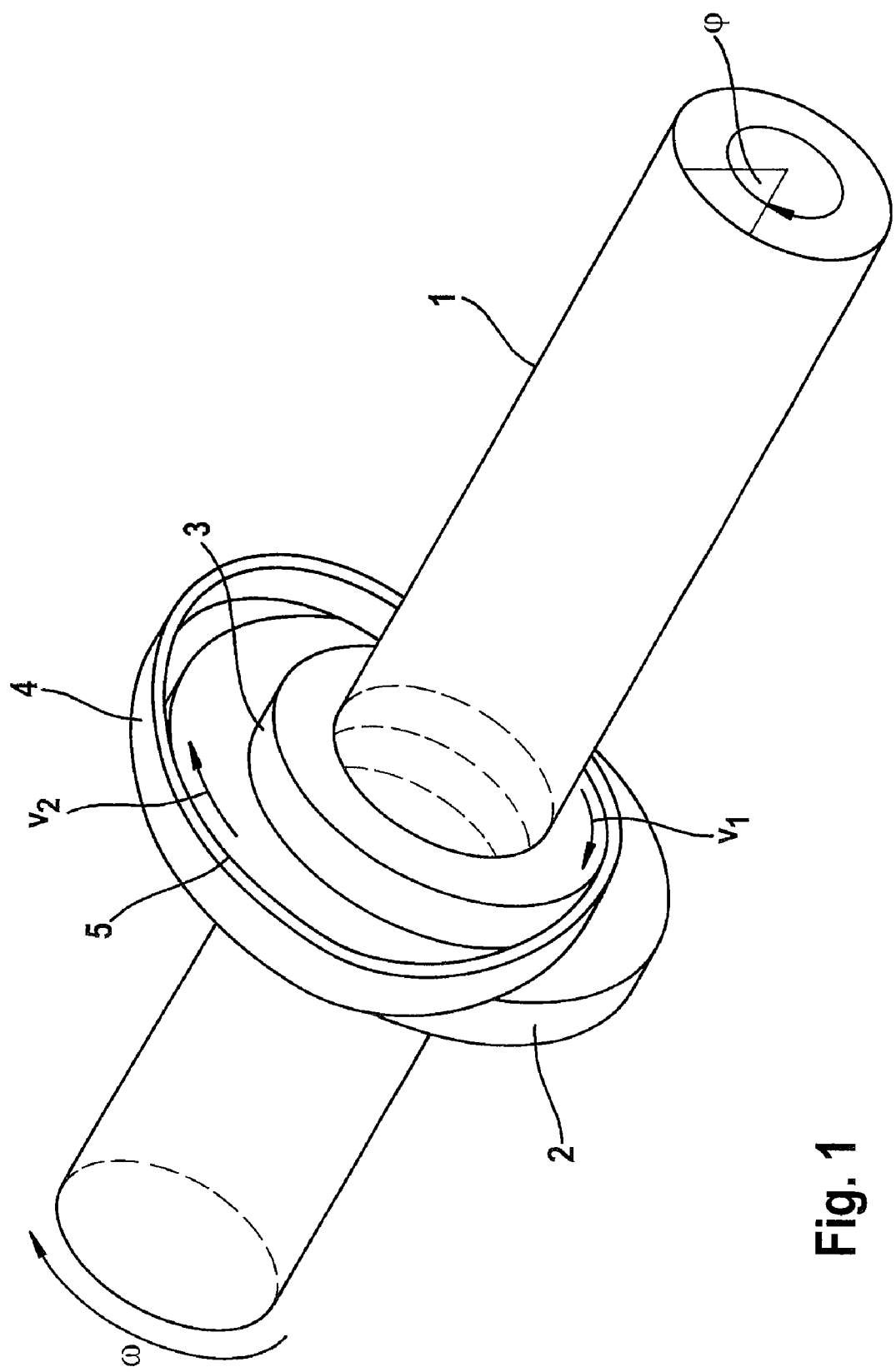
FIG. 1 shows a shaft with two discs arranged side by side and fixed on the shaft, a belt being forcedly guided via the discs; as well as FIG. 2 shows an angle measuring device which integrates the mechanics and the associated sensor electronics in a housing.

FIG. 1 illustrates two discs 2 and 3 being fixed side by side on a shaft 1. A belt 4 is forcedly guided via disc 2, on the one hand, and via disc 3, on the other hand. Different circumferential speeds $v_1$ and $v_2$ develop at the inner circumference 5 of the belt 4 during a rotational movement $\omega$ of the shaft 1 about the angle $\varphi$. In this case, the circumferential speed $v_2$ which develops in the area where the belt 4 abuts on the disc with larger circumference 2 is higher than the circumferential speed $v_1$ which develops in the area where the belt 4 abuts on the disc of smaller circumference 3. The result of the difference between these circumferential speeds is a movement of the belt 4 which occurs relative to the rotational movement $\omega$ of shaft 1.

Figure 2:
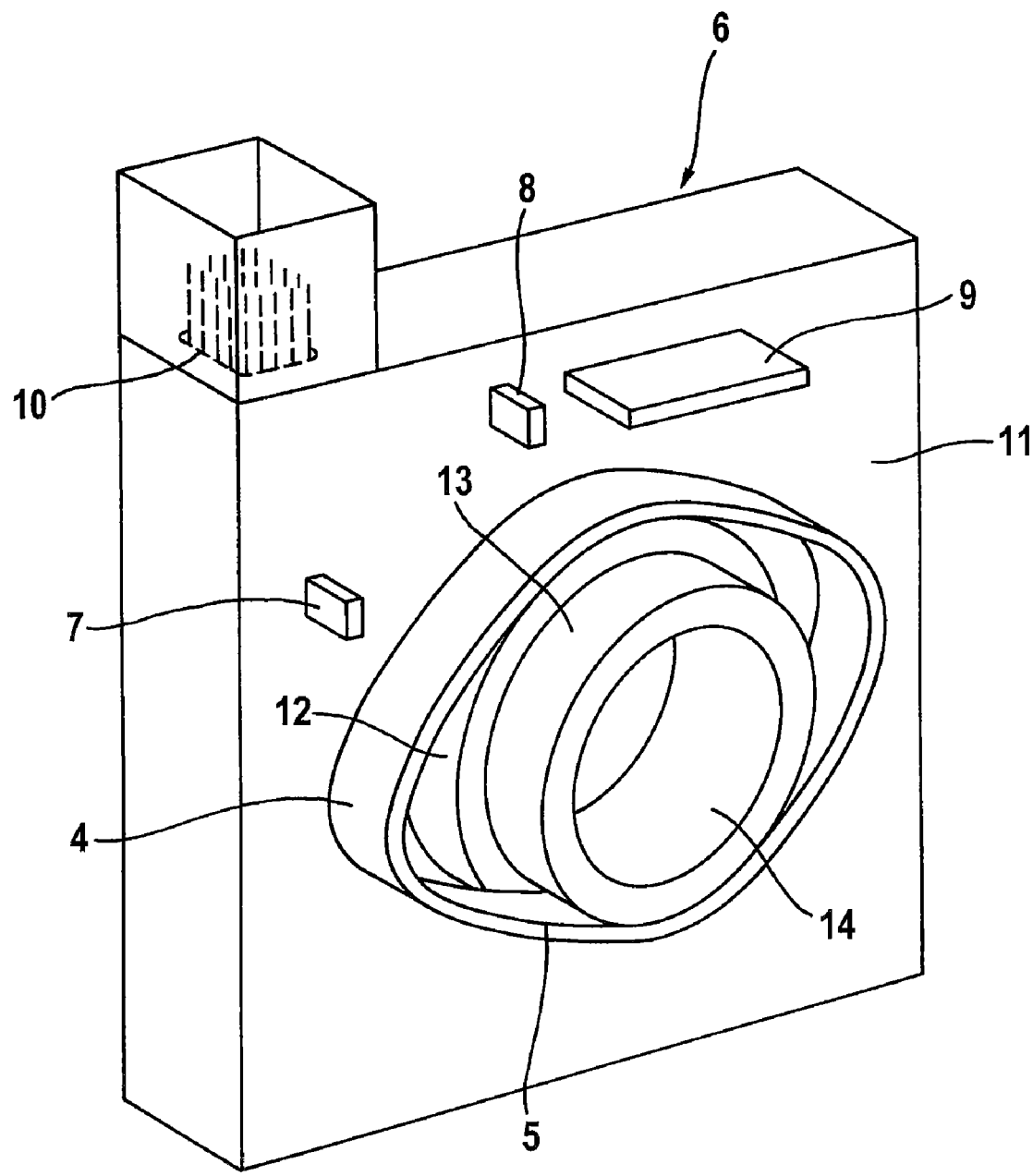

The angle measuring device 6 illustrated in FIG. 2 comprises as a mechanical base element a disc 14 which has two different outer circumferences 12, 13, and an axially centered bore for the accommodation of a shaft whose angle of rotation is to be detected. A belt 4 is in each case forcedly guided via the larger outer circumference 12 and via the smaller outside circumference 13 of disc 14. A movement of the belt 4 relative to the rotational movement occurs due to the different circumferential speeds developing at the inner circumference of the belt upon rotation of the disc. As this occurs, the belt 4 displaces in a special fashion on the disc 14 depending on the direction of rotation and the angle of rotation. This displacement of the belt 4 is detected by the two sensors 7 and 8. Sensor 8 detects the position of the belt in a revolution by utilizing the special encoding of the belt. On the other hand, sensor 7 detects the positioning of the belt 4 in relation to the rotational movement, from which the number of revolutions is inferred. During the relative movement of the belt, its non-abutting part is shifted a defined distance depending on the direction of rotation and the angle of rotation. As this occurs, each of the two non-abutting parts of the belt 4 forms a half loop, which becomes larger or smaller depending on the direction of rotation and the rotational movement. Based on the data of the two sensors 7 and 8, the processing electronics on the board 9 calculates the absolute total angle or rotation of the disc, which in the event of a fixation on a shaft is equal to the angle of rotation of this shaft. The angular information is sent in digital form to the electronics of the motor vehicle control system via a plug 10 integrated into the housing 11.

The invention claimed is:

1. Angle measuring device for measuring an absolute angular position, said angle measuring device comprising a flexible pulling element,
wherein the flexible pulling element is guided directly or indirectly via a shaft whose angle of rotation ($\phi$) is to be detected, with different circumferential speeds ($v_1$, $v_2$) developing at an inner circumference of the flexible pulling element during a rotational movement of the shaft, with the result that a change in position of the flexible pulling element relative to the rotational movement occurs, and the angle of rotation ($\phi$) of the shaft is inferred from the change in position of the flexible pulling element.

2. Device as claimed in claim 1,
wherein the flexible pulling element is guided via at least one disc arranged axially on the shaft whose angle of rotation ($\phi$) is to be detected, or via the shaft, in such a fashion that in an area in which the flexible pulling element is guided via the at least one disc or via the shaft during a rotational movement of the shaft, different circumferential speeds ($v_1$, $v_2$) develop at the inner circumference of the flexible pulling element in spite of equal angular speed ($\omega$).

3. Device as claimed in claim 1,
wherein the angle of rotation ($\phi$) is to be detected from a disc with a uniform transition from a small outer circumference to a large outer circumference or a disc with two segments of different outer circumference, or two discs of different outer circumference being arranged side by side on an axle are axially fixed on the shaft, and
the flexible pulling element is guided via the at least one disc, via the smaller disc circumference and via the larger disc circumference.

4. Device as claimed in claim 3,
wherein an outer circumference of the at least one disc or the shaft has a toothed design.

5. Device as claimed in claim 1,
wherein an orientation of a direction of rotation and an absolute total angle of rotation ($\phi$) of the shaft is inferred from the position of the flexible pulling element which changes depending on an orientation of a direction of rotation and depending on the angle of rotation ($\phi$) of the shaft.

6. Device as claimed in claim 1,
wherein the flexible pulling element is magnetically encoded, and
a position of the magnetically encoded flexible pulling element is detected by at least one magnetic sensor.

7. Device as claimed in claim 1,
wherein the flexible pulling element is marked in optical or tactilely determinable fashion or has identification markings, and
the position of the flexible pulling element is detected by at least one optical sensor or contact sensor.

8. Device as claimed in claim 1,
wherein a sensor detects the angle of rotation ($\phi$) within a revolution and another sensor detects a number of the revolutions.

9. Device as claimed in claim 1 further comprising:
a toothed wheel with two different diameters that is fixed on the shaft whose angle of rotation ($\phi$) is to be detected,
the flexible pulling element being guided via different diameters of the toothed wheel, and
a board with processing electronics and a housing with an integrated plug.

10. Use of the device as claimed in claim 1 in a steering angle sensor for motor vehicles.

\* \* \* \* \*